United States Patent [19]
Krawetz et al.

[11] 3,789,321
[45] Jan. 29, 1974

[54] ELECTRON BEAM-PUMPED GAS LASER SYSTEM

[75] Inventors: Barton Krawetz; Jack B. Long; Leonard J. Mooney, all of Livermore, Calif.

[73] Assignee: The United States of America as represented by the United States Atomic Energy Commission, Washington, D.C.

[22] Filed: Sept. 14, 1972

[21] Appl. No.: 289,029

[52] U.S. Cl. ............................................. 331/94.5
[51] Int. Cl. ............................................... H01s 3/02
[58] Field of Search .................................. 331/94.5

[56] References Cited
UNITED STATES PATENTS
3,702,973  11/1972  Daugherty .................... 331/94.5

Primary Examiner—William L. Sikes
Attorney, Agent, or Firm—John A. Horan; F. A. Robertson; L. E. Carnahan

[57] ABSTRACT

An electron beam-initiated-and-sustained gas laser system capable of producing uniform, high energy, large-volume electrical discharges in a high-pressure gaseous lasing medium. A thin metallic window separates the low pressure electron gun cavity from the longitudinally parallel high pressure gas cavity, such that the injected primary electrons create low energy secondary electrons which are swept across the gas cavity by an applied electric field collisionally exciting the gaseous medium. The system is applicable in both the oscillator and amplifier configurations, and is capable, for example, of producing a 10 joule/liter of active volume short (tp $\approx$ 1 ns) $CO_2$ laser pulse, while being operable in a manned area due to the housing being electrically neutral.

5 Claims, 2 Drawing Figures

ELECTRON BEAM-PUMPED GAS LASER SYSTEM

BACKGROUND OF THE INVENTION

The invention described herein was made in the course of, or under, Contract No. W-7405-Eng-48 with the United States Atomic Energy Commission.

The present invention relates to an electron beam-pumped gas laser system, and more particularly to such a laser system wherein large quantities of energy can be uniformly delivered to the lasing medium.

It is well established that large volumes of high pressure gaseous lasing medium can be pumped to high inversion densities by injecting an electron beam of densities greater than a few milliamperes per square centimeter and at energies from an external source sufficiently large to produce substantially uniform excitation, as exemplified by U. S. Pat. No. 3,641,454 issued Feb. 8, 1972, to Barton Krawetz, coinventor in this application, and assigned to the same assignee.

SUMMARY OF THE INVENTION

The invention constitutes an improved laser system over the system described and claimed in the above-referenced U. S. Pat. No. 3,641,454 thereby resulting in improved power output.

Therefore, it is an object of the invention to provide an electron beam-initiated-and-sustained gas laser system.

A further object of the invention is to provide an electron beam-pumped, electrical-discharge, gas laser system wherein large quantities of energy can be uniformly delivered to a lasing medium.

Another object of the invention is to provide an improved electron beam-pumped laser system wherein the electron generator is positioned longitudinally parallel to the gaseous medium such that electrons uniformly traverse the gaseous medium along substantially the entire length of the gaseous medium vessel.

Other objects of the invention will become readily apparent from the following description and accompanying drawings.

DESCRIPTION OF THE INVENTION

Figure 1:
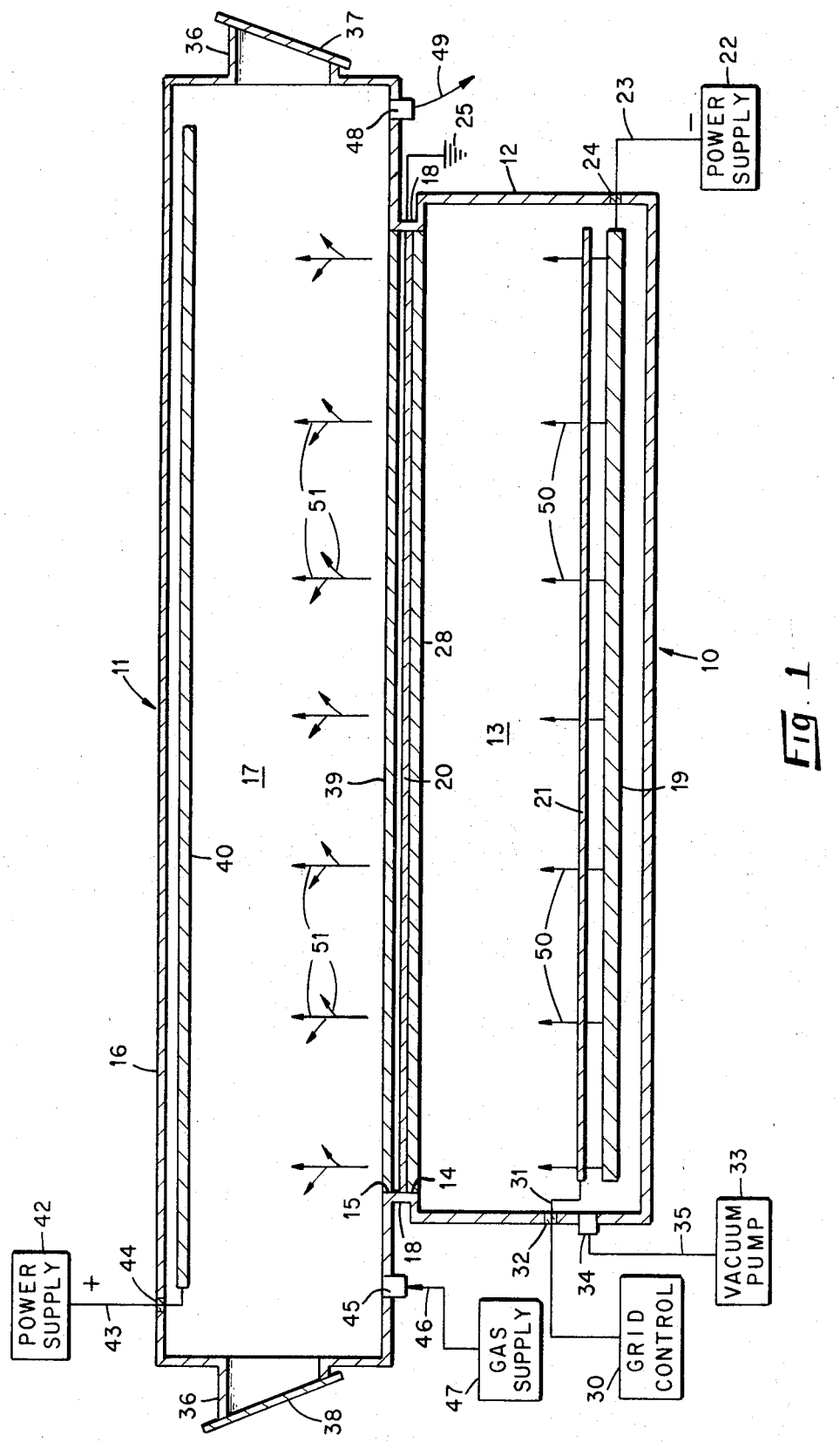
FIG. 1, partially in cross-section, illustrates an embodiment of the invention.

An embodiment of the inventive electron-beam-initiated-and-sustained electrical-discharge high-energy gas laser system is illustrated in FIG. 1 in the amplifier configuration and basically consists of a hot cathode electron-gun assembly and a gaseous laser amplifier assembly indicated generally at 10 and 11, respectively. The electron-gun assembly 10, capable of electron energies in excess of 200 keV and current densities in excess of 200 mA/cm$^2$, comprises a housing or casing 12 defining therein a chamber 13 having a longitudinal opening 14 adjacent a longitudinal opening 15 in a container or vessel 16 defining therein a cavity or chamber 17, casing 12 and vessel 16 being interconnected by a flange 18 of vessel 16. It is understood that casing 12 and vessel 16 are electrically neutral and may be integral if desired, and may, for example, be constructed of stainless steel. In this embodiment the electron-gun assembly, as known in vacuum tube terminology, is of the triode beam power tube type comprising a cathode 19, an anode 20, and a control grid 12. Cathode 19, for example, may be composed of 100, 20 cm long pure tungsten wires spaced 1 cm apart to achieve an active length of 100 cm, and is connected to a power supply 22 via lead 23 which extends through an insulative sealing or feedthrough member 24 in casing 12, and is electrically negative with respect to ground, with power supply 22 being at −100 kV to −2 MV, for example, a −200 kV being utilized in this embodiment. Anode 20 is secured to flange 18 of vessel 16 which is electrically connected to ground, as indicated at 25, and consists of a thin sheet or layer (1/2 to 10 mil) of aluminum, titanium or a plastic such as KAPTON manufactured by E. I. DuPont, for example, forming in effect a "window" between chambers 13 and 17 transparent to electrons, and is supported by a hibachi grid or grill-like member 28 which is secured to flange 18 of vessel 16 and thus electrically grounded. In this embodiment a 0.0015 inch thick aluminum window is utilized and located 14 cm from the grid 21. Hibachi 28 is constructed of material, such as stainless steel, and of a configuration so as to produce minimum interference with the electron flow between cathode 19 and anode or window 20 while providing structural support for anode 20 in view of the thinness thereof and length which is about 1 meter, for example. When the window 20 is constructed of plastic (1 ½ mil KAPTON for example), a layer of aluminum several hundred (200 for example) angstroms thick is plated on the KAPTON and connected to an electrical potential (slightly positive with respect to ground in this embodiment) to create a bias to repel positive ions formed in the gas in chamber 17, and to bleed off a static charge created on the window. Control grid 21 is located 2 cm from cathode 19, composed of 100, 40 mil diameter wires, and is electrically connected to a grid conrol generally indicated at 30 via lead 31 which extends through an insulative or feedthrough sealing means 32 in casing 12, grid control 30 operating in the manner described hereinafter with respect to FIG. 2. If desired a focusing ring or shield about the outer edge either control grid 21 or cathode 19 and at the potential of the control grid or cathode, respectively, to focus electrons onto the window or anode 20 whereby less dispersion of electrons results. Chamber 13 is under vacuum and is pumped down by a vacuum pump 33 connected to an opening 34 via conduit 35 such that the base pressure, for example, is about $6 \times 10^{-8}$ torr with the pressure at the time of firing the gun 10 being less than $1 \times 10^{-6}$ torr. The casing 12, constructed, for example, of stainless steel, is provided on the interior surface thereof with a finish which allows proper pump down of chamber 13. Several different pumping systems may be utilized and the vacuum pumping system may be integral with the casing 12 and not remotely located as shown.

Vessel 16 of laser amplifier assembly 11 has, for example, a gas cavity of 10 cm radius (31.4 liter of active volume) and is provided at each end thereof with outwardly protruding portions 36 on which are positioned Brewster angle windows 37 and 38 which may, for example, be constructed of sodium-chloride (NaCl), and through which a light beam to be amplified is directed. Windows 37 and 38 are transparent to light at frequencies which the gaseous medium exhibits gain. Vessel 16 contains a cold cathode or grid 39 and an anode 40.

Cathode 39 functions to intercept arcs from anode 40 and thus provide protection for the thin window 20, and is positioned, for example, about 2 cm from window or anode 20 and is electrically connected to ground 25 via flange 18 of vessel 16, cathode or protective grid 39 being constructed of 14 gauge brass (0.083 inch diameter) for example. Cathode or grid 39 may be connected electrically directly to window 20. Anode 40, constructed of stainless steel, for example, is connected to a power supply 42 via a lead 43 which extends through an insulative seal or feedthrough 44 in vessel 16. For example, power supply 42 is at a positive potential of 50 kV to 300 kV with respect to ground, 100 kV being utilized in this embodiment. Anode 40, for example, may be rounded at the edges thereof to reduce arcing. Also, anode 40 may be provided with a blackened surface such as with anodized aluminum or copper oxide to prevent selflasing effects. Chamber 17 is filled with a gaseous lasing medium such as $CO_2$, $N_2$, and He, or a mixture thereof at a pressure ranging from 1–10 atmospheres. In addition, the rare gases Ne, Ar, Kr, Xe and Rn may be utilized provided high potential power supply for the electron gun 10 is utilized. The chamber 17 is filled with the pressurized lasing media through an inlet opening or port 45 connected via a conduit 46 to a gas supply 47 as indicated by the arrow, it being understood that appropriate valving is provided to prevent gas being forced from the chamber back into the supply system upon excitation of the laser. Pumpout of the gas from chamber 17 is accomplished via an outlet port 48 connected to appropriate apparatus as indicated by the arrow at 49.

Figure 2:
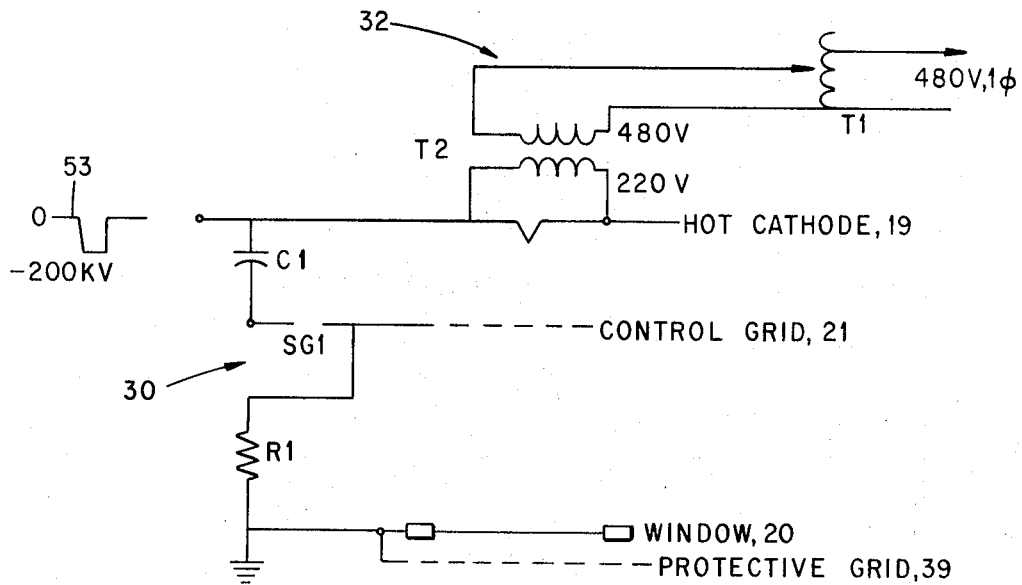
FIG. 2 schematically illustrates the system electronics.
Figure 2:
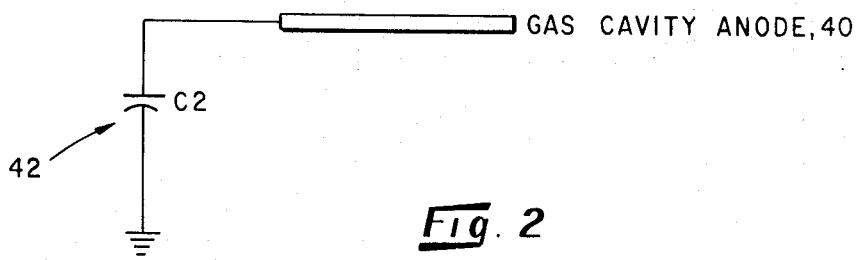

Referring now to FIG. 2, an embodiment of the electronics for the FIG. 1 system are schematically illustrated. The negative 200 kV pulse 53 for electron gun 10 from power supply 22 is derived from a six stage, 7.5 kJ Marx generator incorporating a series 50 ohm resistor for current limiting in case of an arc in the gun. Grid bias control (30) for the control grid 21 is provided by a simple capacitor C1, resistor R1, spark gap SG1 combination. Capacitor C1 has a capacitance of 14.7 μf while resistor R1 has resistance of 100KΩ. In practice the grid bias capacitor C1 is precharged to the desired voltage. Application of the 200 kV pulse 53 then causes the spark gap SG1 to overvoltage and bias the grid. The 20 mil tungsten filaments of cathode 19 require 40 kW of power and are heated for 3 to 5 seconds before application of the 200 kV pulse. Cathode filament power is obtained from a variable powerstat T1 which drives a filament transform T2 that is isolated for 250 kV DC primary to secondary. The powerstat T1-filament transformer-T2 combination is capable of 300 kW for 20 minutes on, 40 minutes off, thereby providing the ability to operate more than seven of the guns 10 simultaneously. A gas sustainer bank C2 for gas cavity anode 40 is up to a 50 μf, 300 kV bank without switching. Bank C2 is precharged to the desired voltage (less than the voltage required to produce breakdown in the gas in chamber 17) and is switched automatically by the e-beam 51 entering the gas cavity or chamber 17.

In operation, the chamber is filled, for example, with a lasing medium mixture of 40 percent $CO_2$, 50 percent $N_2$, and 10 percent He by volume and the power supply 42 is turned on and the voltage brought up until that voltage impressed across the electrodes 39 and 40 is slightly less than the breakdown voltage of the gas lasing medium in chamber 17. The chamber is pumped down to the base pressure and electron gun 10 is then turned-on to bring the cathode 19 up to operating temperature whereby chamber 13 remains at a vacuum, for example, of about $10^{-6}$ torr, whereup the grid control 30 is activated which activates control grid 21 and the gun 10 fires causing a uniform flow or beam of electrons indicated by arrows 50, having an emission of 1 amp/cm², for example, from the negative cathode 19 toward the window or anode 20 which is at ground and thus positive with respect to cathode 19. The beam of electrons 50 is driven for 1–10 μsec duration, for example. The electrons 50 pass through thin window 20 and interact with the material of the window and the lasing medium to produce secondary electrons 51 which are attracted toward the positive anode 40 in such a manner as to disperse uniformly through substantially the entire volume of chamber 17. Cathode 39 does not interfere with the secondary electrons and could be eliminated except that thin window 20 would be damaged by the large electrical discharge or arcs across chamber 17. The passage of the beam of electrons 51 through the gaseous lasing medium in chamber 17 causes ionization of the lasing medium by electron collision thereby triggering a large, uniform electrical discharge between electrodes 39 and 40. Both the electron pulse (electrons 51) and the triggered electrical discharge across electrodes 39 and 40 excite the lasing medium, creating a large population inversion, whereby a light beam passing through windows 37 and 38 is amplified. For example, with the gaseous lasing mixture set forth above, the beam electrons and discharge electrons excite the mixture to high-energy states by collision, whereby the excited $N_2$ resonantly transfers energy to the unexcited $CO_2$ such that a population inversion is generated in the lasing state of the $CO_2$ molecules and spontaneous emission from the excited $CO_2$ initiates lasing in the oscillator configuration, while in the amplifier configuration a light beam passing through windows 37 and 38 is amplified by stimulated emission.

By the way of example only, and with the lasing medium being of the $CO_2$—$N_2$—He mixture set forth above and at a pressure of about 3 atmospheres, the electric field between the electrodes 39 and 40 is about 5 to 15 kv/cm, with the energy of the electron pulse from gun 10 being about 200–5000 joules. Thus, a total energy content on the order of 20,000 joules may be deposited in the gaseous mixture. Approximately ½ to 1 percent of this energy is available for short pulse amplification giving a total energy output on the order of a few hundred joules in a nanosecond light pulse, implying powers on the order of $10^5$ megawatts in the light.

With the power supplies 22 and 42 at the potentials indicated above and chamber 17 filled with a $CO_2$ mixture at a pressure of about 3 atmospheres and with the emission of electrons 50 from cathode 19 of gun 10 being about 1 amp/cm², the secondary electrons 51 have an energy of about 2–3 ev., the energy of electrons 51 being independent of the specified emission of cathode 19.

While the invention has been illustrated and described in an amplifier configuration it can be utilized equally effective in an oscillator configuration by providing an appropriate reflector member in properly aligned and spaced relation with respect to each of Brewster angle windows 37 and 38 so as to define an optical resonant cavity, as known in the art. Also, while the electron gun assembly 10 has been described and illustrated as being of a specific triode-type embodiment, the invention is not limited to this gun configuration.

While the filaments of hot cathode 19 have been described as being of pure tungsten, filaments of thoriated tungsten, tantalum and rhenium may be utilized, which may provide more current density at lower temperatures with better mechanical stability. Also, the interior of vessel 16 and/or anode 40 can be blackened to prevent self lasing effects by inserting sheets of materials such as anodized aluminum, honeycomb, felt, etc.

Safety factors provided by the inventive laser system enable the system to be operated in a manned area, this being due primarily to the housing (casing 12 and vessel 16) being electrically neutral and of a wall thickness sufficient to provide x-ray shielding. In addition, view ports of lead glass of appropriate thickness may be provided in vessel 16 without decreasing the safety factors.

While the inventive laser system has been described utilizing a high-pressure gaseous lasing medium, the system may also utilize low-pressure gaseous lasing medium, thus are pressure range of 0.1 to 10 atmospheres is possible with this system. Also, if desired a substantially continuous laser pulse may be produced by the grid pulse control activating the system at a faster pulse rate.

It has thus been shown that the present invention provides a structural configuration which provides improved lasing capabilities over the electron beam-pumped gas laser configuration covered by the above-referenced U. S. Pat. No. 3,641,454.

What we claim is:

1. An electron beam-initiated-and-sustained electricaldischarge gas laser system comprising: a vessel containing a gaseous lasing medium under pressure, said vessel comprising a housing defining a longitudinally extending closed chamber therein, Brewster angle windows transparent to light at frequencies which the medium exhibits gain positioned in opposite endwalls of said housing, a pair of electrode means positioned in spaced relation longitudinally within said chamber, said electrode means extending along a major portion of the longitudinal length of said housing, said pair of electrode means comprising a longitudinally extending cathode and a longitudinally extending anode, said cathode being connected electrically to ground and said anode being connected electrically positive with respect to ground, means electrically connected to said cathode and anode for impressing thereacross a voltage less than the breakdown voltage of said pressurized gaseous lasing high energy medium, means for supplying said chamber with said gaseous lasing medium, window means transparent to high energy electrons positioned longitudinally in said housing and in close proximity to said cathode, said window means comprising a thin longitudinally extending member defining a portion of a wall surface of said chamber and extending along a major longitudinal portion of said housing, said window means being supported by a grill-like member, said window means and said grill-like member being supported by said housing and electrically connected to ground, electron generating means positioned longitudinally parallel to and along a major portion of said housing adjacent said window means, said electron generating means including a longitudinally extending casing secured to said housing so as to define a chamber in open communication along the longitudinal length thereof with said window means, means connected to said casing for producing a vacuum in said last-mentioned chamber, said window means defining an anode of said electron generating means, cathode means positioned longitudinally in said casing in spaced relationship with said window means and connected electrically negative with respect to ground, means for producing a voltage drop between said cathode means and said window means including a negative potential power supply electrically connected to said cathode means, and means for controlling said voltage drop comprising a control grid positioned in said chamber intermediate said cathode menas and said window means and means for controlling said control grid, whereby activation of said electron generating means directs at least one beam of high-energy electrons along substantially the longitudinal length and throughout substantially the cross-sectional area of said housing and through said gaseous lasing medium in said first-mentioned chamber ionizing it slightly and triggering and sustaining a large uniform electrical discharge between said cathode and said anode exciting the lasing medium and creating a large population inversion allowing stimulation thereby producing a high energy output.

2. The laser system defined in claim 1, wherein said gaseous lasing medium is selected from the group consisting of $CO_2$, $N_2$, He, selected rare gases, and mixtures thereof.

3. The laser system defined in claim 1, wherein said pressurized gaseous lasing medium is at a pressure in the range of about 1 to 10 atmospheres.

4. The laser system defined in claim 1, wherein said gaseous lasing medium is retained in said longitudinally extending chamber of said housing at a pressure of about 1 to 10 atmospheres, and selected from the group consisting of $CO_2$, $N_2$, He, rare gases, and mixtures thereof.

5. The laser system defined in claim 1, wherein said window means comprises a layer of material having a thickness in the range of about ½ to about 10 mils and selected from the group consisting of aluminum, titanium, and KAPTON.

* * * * *